United States Patent

[11] 3,630,833

| [72] | Inventor | Rodger L. Fife<br>San Jose, Calif. |
|---|---|---|
| [21] | Appl. No. | 798,771 |
| [22] | Filed | Feb. 12, 1969 |
| [45] | Patented | Dec. 28, 1971 |
| [73] | Assignee | Georgia-Pacific Corporation<br>Portland, Oreg. |

[54] PROCESS FOR MAKING MOISTURE RESISTANT, STIFFENED PAPER CONTAINING ISOPRENE RESIN AND PRODUCT
10 Claims, No Drawings

[52] U.S. Cl. ...................................... 162/163, 162/169, 260/820
[51] Int. Cl. .................................... D21d 3/00, D21h 3/02
[50] Field of Search ........................... 162/163, 169; 260/820, 943

[56] References Cited
UNITED STATES PATENTS

| 1,699,369 | 1/1929 | McGauack | 260/820 |
| 1,993,280 | 3/1935 | Murphy | 260/820 |
| 2,101,089 | 12/1937 | Novak | 260/820 |
| 3,305,435 | 2/1967 | Williston | 162/163 |

FOREIGN PATENTS

| 637,227 | | Great Britain | 162/169 |

OTHER REFERENCES

Casey, Pulp and Paper, Vol. II, 2nd edition, pp. 975–980.
Yost, Effect of Certain Latex Variables in Beater Addition of Nitrile Rubber Latices, TAPPI, Vol. 34, Jan.

*Primary Examiner*—S. Leon Bashore
*Assistant Examiner*—Richard H. Anderson
*Attorney*—Peter P. Chevis

ABSTRACT: An aqueous mixture of lignosulfonate and an isoprene resin ground to particulate form having a melting point of 80–130° C. in the ratio of liquosulfonate to isoprene resin in the range of 0.2:1 to 4:1 based on the dry weights is added to an aqueous slurry of cellulosic fibers. The aqueous mixture of liquosulfonate and resin can be stabilized with acetic acid or a mixture of acetic acid and an alkali metal acetate. A paper web is formed from the slurry, dewatered and heated to a temperature exceeding the melting point of the isoprene resin to fix the resin onto the cellulosic fibers without requiring a fixing agent.

PROCESS FOR MAKING MOISTURE RESISTANT, STIFFENED PAPER CONTAINING ISOPRENE RESIN AND PRODUCT

This invention pertains to a method for the preparation of paper sheet and the composition thereof. More particularly, it pertains to the treatment of cellulosic fibers with a mixture of a lignosulfonate and an isoprene resin.

In many applications, it is often very desirable to have paper products possessing a certain stiffness and resistance to high humidity and water pickup. For example, in the manufacture of containers used for produces, such as vegetables and fruits, it is desirable to employ a paperboard or a corrugating medium having a certain degree of stiffness to protect the products in the containers. It is also desirable to have the product resistant to high humidity to which the containers are frequently exposed. The paper products or board used in container manufacture usually contain 7 to 10 percent by weight of moisture which may increase to above 30 percent upon exposure to a high humidity or an environment of high moisture content. With the increase in moisture content, the container generally loses the major portion of its rigidity and strength. Even though the container may retain sufficient strength to hold the products packed in the container, it generally does not have sufficient rigidity and strength for stacking of the containers or to withstand the normal handling involved in shipment.

Various methods and materials have been proposed for stiffening paper and increasing its moisture resistance. However, many of the agents proposed are too costly, or difficult to apply. Also, the treatment of the paper with many of the stiffening agents results in poor glueability making the paper sheet or material not practical for use as a corrugated medium or as a liner for corrugated box material or paperboard used for containers which are formed by the use of glue.

It is, therefore, an object of this invention to provide a method for the preparation of a paper stock which will have improved stiffness and rigidity. A further object is to provide a process for the preparation of a paper product of improved stiffness which is relatively resistant to moisture and will retain a substantial portion of its strength and rigidity upon exposure to high moisture or humidity conditions. Ad additional object is to provide a method for the preparation of stiffened paper with improved water resistant properties without adversely affecting the strength or other desirable properties. A still further object is to provide a moisture resistant, stiffened paper having improved glueability.

The above and other objects are attained, according to this invention by treating the cellulosic fibers in an aqueous slurry with a mixture of a lignosulfonate and an isoprene resin prior to the formation of the paper sheet. The paper sheet obtained with the treated fibers is resistant to moisture and upon exposure to high humidity or high moisture environment will only about double its normal moisture content and retain its rigidity and strength to permit the handling and stacking of the containers containing the product.

Further, when the paper sheet or product is used as a corrugating medium, it permits increased running speed not only in the corrugating or fluting machinery but in the corrugated board formation. The treatment improves adhesion and also the fluff and release of the sheet from the machinery rolls.

The isoprene resins which are used in the treatment of the paper are resins obtained upon polymerization of isoprene to obtain polymers having a melting point in the range of from 80° to 130° C. They are generally hard, friable thermoplastic resins and are often prepared by the polymerization of isoprene or by the polymerization of isoprene fractions obtained in the pyrolytic or steam cracking of hydrocarbon feed stocks in the manufacture of ethylene and propylene. Fractions obtained as by-products in this reaction contain predominantly isoprene and other closely related products which may be polymerized to form a resin operative in this invention. One such product, sold commercially under the trademark of BETAPRENE by the Reichold Chemical Company, is believed to be formed mainly of isoprene derivative repeating units having the formula:

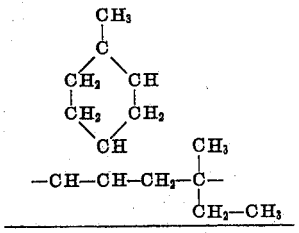

The lignosulfonates used in the invention may be obtained by sulfonation, by the various known methods, of lignin obtained from any source. Lignin is a polymeric substance of substituted aromatics found in plant and vegetable tissue associated with cellulose and other plant constituents. Thus, vegetable and plant tissue are lignin-containing materials which are the principle sources of lignin.

One of the main sources for lignosulfonate is the residual pulping liquors from the pulp and paper industry where lignocellulosic materials, such as wood, straw, corn stalks, bagasse, and the like, are processed to separate the cellulose or pulp from the lignin. In the sulfite pulping process, the lignocellulosic material is digested with a sulfite or bisulfite to obtain a sulfonated residual pulping liquor commonly referred to as "spent sulfite liquor" wherein the sulfonated lignin is dissolved. In other pulping processes, the residual pulping liquor as obtained from the process may not be a sulfonated product. However, the residual liquors or products containing the lignin portion of the lignocellulosic materials from the other processes and also from the sulfite process may be treated by various known methods to sulfonate the product to the degree desired. For example, the residual liquor obtained in an alkaline pulping process such as kraft, soda or alkaline processes may be sulfonated and used.

The lignosulfonate product obtained from the sulfite pulping process or by the sulfonation of other residual pulping liquors or lignin-containing material may contain many other constituents besides the sulfonated lignin. For example, spent sulfite liquor may contain from 60 to 70 percent of sulfonated lignin with the remainder of the solids being carbohydrates, degradation products of carbohydrates, and resinous materials as well as other organic and inorganic compounds. While all or part of these other materials may be removed, it is not necessary to do so. The liquor may be fermented to remove the carbohydrates or fractionated by dialysis, solvent extraction or other means used to obtain not only a substantially purified lignosulfonate product but a product of a particular molecular weight range.

Thus, the terms "lignosulfonate" or "lignosulfonates" as used herein, as commonly used, include the purified sulfonated lignins as well as the unpurified sulfonated lignin products such as spent sulfite liquors and sulfonated residual pulping liquors.

In the preparation of the lignosulfonate-resin mixture for the treatment of the cellulosic fibers, the resin in a fine particulate form of less than 250 microns in size is dispersed in a lignosulfonate solution, since the lignosulfonate is soluble in water. In intermixing the resin with the lignosulfonate solution, a temperature above room temperature, for example 35° to 65° C., may be conveniently used. It is generally preferred to have the resin in a particle size as small as possible with a practical size being in the range of from 50 to 150 microns. The resin is friable and thus may be easily ground by the usual methods. Generally, when the resin is ground dry or in an aqueous medium, small amounts of grinding aid and a surfactant may be employed. Although the ratio of lignosulfonate to resin may be widely varied, generally the lignosulfonate is intermixed with the resin in a weight ratio of from 0.2 to 4.0 of lignosulfonate solids for each part of resin. Preferably, a ratio in the range of 0.75 to 2.0 parts of lignosulfonate per one part of resin is used.

The concentration of the resin and lignosulfonate in the aqueous mixture likewise may be widely varied. Generally, the content of the resin and lignosulfonate in the mixture is in the range of from 10 to 20 weight percent. However, more dilute mixtures, such as 5 percent or less as well as considerably more concentrated mixtures may also be used. The increased viscosity of the highly concentrated mixtures, for example, containing more than 50 percent solids, may not be as conveniently handled as the less viscous, less concentrated slurries or mixtures.

In addition to grinding the resin prior to intermixing with lignosulfonate, the resin may be ground and intermixed with lignosulfonate in one step by grinding the resin in a lignosulfonate solution or as a dry mixture. When this is done, the resin is usually added to the lignosulfonate solution in an amount to obtain the desired ratio of resin to lignosulfonate in the final product. A solution of lignosulfonate containing from 20 to 50 percent solids may be conveniently used as the grinding medium. In addition to grinding the resin in the lignosulfonate, a dispersion of the resin in the lignosulfonate may also be obtained without grinding by forming an emulsion of the lignosulfonate with the resin at a temperature above the melting point of the resin and then cooling the mixture. Another method which may be used is to form an emulsion of the lignosulfonate with the resin by intermixing a lignosulfonate solution with a solution of the resin in a solvent and then evaporating the solvents after the emulsification.

The effectiveness of the lignosulfonate-resin mixture is enhanced upon the addition of a small amount of an acetic acid stabilizer in an amount in the range of 0.001 to 1 weight percent of the lignosulfonate-resin solids. Preferably, the stabilizer is used in an amount of from 0.01 to 0.1 weight percent as a mixture of acetic acid and an alkali metal acetate such as sodium or potassium acetate. The preferred stabilizer may be conveniently formed by adding an alkali metal soluble salt, such as, for example, sodium chloride, to an acetic acid aqueous solution. A surfactant may likewise be added to the stabilizer to insure uniform distribution upon addition to the mixture.

In treating the cellulosic fibers with the lignosulfonate-resin mixture, the mixture is generally added in an amount of from about 0.10 weight percent to 5 weight percent of the mixture solids, based upon the dry cellulose in the slurry, but preferably in an amount of from 0.50 to 2 weight percent. The mixture is intermixed with the pulp or the cellulosic fiber slurry prior to the sheet formation. For example, when a cylinder machine is used, the mixture may be added to the cylinder vats. In a multiple cylinder machine, the mixture may all be added to one cylinder vat or distributed in equal or different proportions among the different vats. Generally, in a multicylinder machine, satisfactory results are obtained by adding the mixture only to some of the vats or cylinders. For example, in a five-cylinder machine the mixture may be equally divided and added to the number three and number four cylinders. In a Fourdrinier machine the mixture may be added to the pulp slurry in the stock chest, fan pumps or before the Jordan refiners.

To obtain the full advantage of the treatment, the paper sheet, during drying or otherwise, is heated to a temperature exceeding the melting point of the resin, preferably to a point at least 20° C. and often from 40° to 60° C. or up to 100° C. above the melting point. This results in the mixture being more uniformly and intimately distributed throughout the sheet enhancing the stiffness and moisture resistance. While the above treatment is especially effective for corrugating medium where moisture and humidity resistance and increased stiffness are desired, the same advantages can be obtained by the use of the mixture in the preparation of other paperboard which may be used for container manufacture or as corrugated box linerboard.

The following example illustrates the invention.

EXAMPLE I

A corrugating medium was prepared from paper stock which had been treated with an isoprene-lignosulfonate mixture.

In the preparation of the lignosulfonate-resin mixture, an isoprene resin obtained by the polymerization of isoprene fraction obtained from hydrocarbon pyrolytic cracking in the manufacture of ethylene and propylene was used. The isoprene resin had a melting point of about 100° C. and was similar to the product sold by Reichold Chemical Company under the trademark of BETAPRENE H. This resin was ground in an impact-type grinder employing about 2½ weight percent of an inert grinding aid.

About 150 pounds of ground resin and 150 pounds of dry spent sulfite liquor solid obtained from the calcium base sulfite pulping process were intermixed in about 300 gallons of water heated to 50° C. A dialkyl dimethyl quaternary ammonium chloride cationic surfactant sold under the trademark of ARGUAD 2C-75 was added in an amount of 20 pounds to the mixture. The mixture was mixed for approximately ½ hour after which about ½ pound of a stabilizer was added which had been prepared by intermixing acetic acid, commercial grade rock salt and water in quantities of about 30 percent by weight of acetic acid, 5 percent of rock salt and the remainder of water. A polyethoxylated fatty acid nonionic surfactant was also added in an amount of about 5 percent.

The mixture thus prepared was added to a pulp slurry used in the preparation of corrugating medium on a cylinder machine. The mixture was added in an amount of about one percent of the lignosulfonate-resin solids, based upon the dry pulp content. The addition was made by adding half of the mixture to the number three cylinder vat and the remainder to the number four cylinder vat of a five cylinder machine.

The paper stock obtained from the so-treated cellulosic fibers, after drying, was passed through a corrugator where the single facer and the hot plate section were operated at about 175° C. resulting in heating the paper stock to a temperature above the melting point of the isoprene resin.

With the treated paper, the machine was operated at a speed of about 25 percent over that obtained with paper stock without the mixture. The formation of the flutes and the release of the medium from the corrugating rolls were also improved.

The glueability of the medium was likewise improved. For the "B" flute, pin adhesions increased from 88 to 115 pounds per 5 square inches.

The medium with the treatment, was considerably stiffer than the corrugated medium obtained prior to the addition of the additive. Also, upon exposure to high humidity and moisture environment, the treated corrugated medium picked up or absorbed water until the medium contained only about 20 percent moisture, while a medium not treated with the mixture of this invention picked up about 33 percent water. The medium prepared from the treated pulp, retained the major portion of its rigidity or stiffness upon exposure to the high humidity and moisture conditions which was not the case with the medium without the treatment.

What is claimed is:

1. In a process for the preparation of paper sheet wherein a paper sheet is formed from an aqueous slurry of cellulosic fibers, the improvement which consists essentially of intermixing the cellulosic fibers in the aqueous slurry with from 0.25 to 5 weight percent of a mixture of a lignosulfonate in an isoprene resin having a melting point in the range of 80° to 130° C. dewatering the cellulosic fibers, and heating the dewatered fibers to a temperature exceeding the melting point of the isoprene resin, said mixture of lignosulfonate and isoprene resin being formed by mixing in an aqueous medium the lignosulfonate with the isoprene resin ground to a particulate form in a ratio of lignosulfonate to the resin in the range of 0.2:1 to 4:1 based upon the dry weights.

2. A process according to claim 1 wherein the isoprene resin and lignosulfonate are mixed in the presence of an acetic acid stabilizer present in an amount from 0.001 to 1 weight percent, based upon the dry weight of the isoprene resin and lignosulfonate solids, prior to intermixing with the cellulosic fiber.

3. A process according to claim 2 wherein the lignosulfonate is a spent sulfite liquor.

4. A process according to claim 3 wherein the ratio of the spent sulfite liquor solids to the resin is in the range of from 0.75:1 to 2.0:1, and the stabilizer is a mixture of acetic acid and an alkali metal acetate present in an amount of from 0.01 to 0.1 weight percent.

5. A process according to claim 4 wherein the spent sulfite liquod solids-resin mixture is intermixed with the cellulosic fibers in an amount of from 0.5 to 2 weight percent.

6. A process according to claim 5 wherein the cellulosic fibers intermixed with the mixture of spent sulfite liquor and isoprene resin are subsequently dewatered and heated at a temperature exceeding the melting point of the isoprene resin by from 20° to 100° C.

7. A process according to claim 6 wherein the paper sheet is heated at a temperature in the range of from 40° to 60° C. in excess of the melting point of the isoprene resin.

8. A paper sheet obtained by the process of claim 1.

* * * * *

UNITED STATES PATENT OFFICE
CERTIFICATE OF CORRECTION

Patent No. 3,630,833              Dated December 28, 1971

Inventor(s) Rodger L. Fife

It is certified that error appears in the above-identified patent and that said Letters Patent are hereby corrected as shown below:

In lines 3 and 6 of the abstract, the word "liquosulfonate" should read ---lignosulfonate---.

Column 1, line 41, the word "Ad" should read ---An---.

Column 2, lines 1 through 11, the formula should appear as follows:

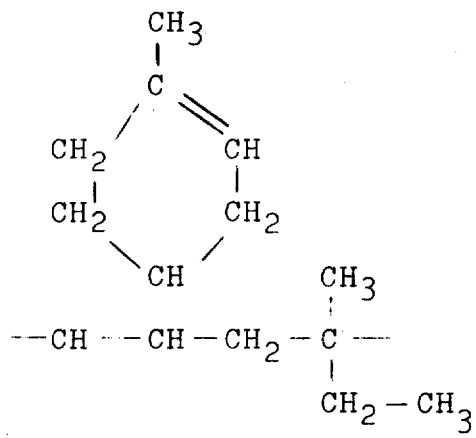

Column 5, line 10, the word "liquod" should read ---liquor---.

Signed and sealed this 4th day of July 1972.

(SEAL)
Attest:

EDWARD M. FLETCHER, JR.
Attesting Officer

ROBERT GOTTSCHALK
Commissioner of Patents